Patented Sept. 3, 1940

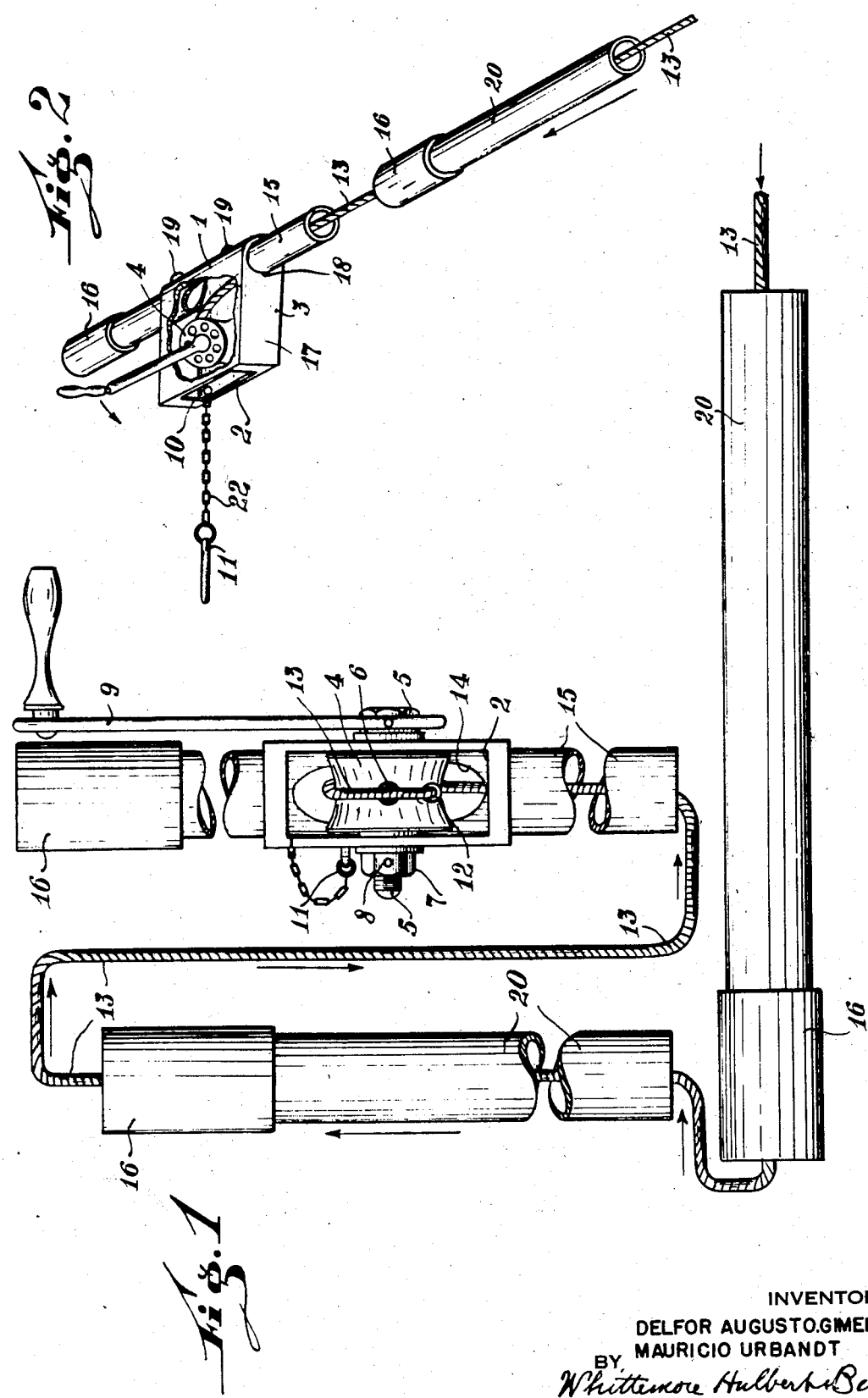

2,213,310

UNITED STATES PATENT OFFICE 2,213,310

COUPLING DEVICE FOR TUBULAR MEMBERS

Delfor Augusto Giménez and Mauricio Urbandt, Buenos Aires, Argentina

Application August 28, 1939, Serial No. 292,306
In Argentina June 3, 1939

1 Claim. (Cl. 189—34)

The present invention relates to coupling devices and in particular to devices for holding together in assembled position a plurality of tubular members arranged in end to end relationship to form a continuous composite tubular assembly, with sleeve joints.

Tubular assemblies of the kind referred to are frequently used to form dismantlable structures such, for example, as the skeleton of a tent or marquee, and are generally designed so that the shorter unit tubes of which the structure is built up are coupled together in sleeved relation by screwing, pinning or the like means, which are troublesome in practice, partly from the nature of the joint to be made and partly because the threads cut on the ends of the unit tubes may become damaged or the cotter pins lost. This disadvantage is particularly felt by the non-mechanically minded person who frequently is the possessor of such dismantlable structures, more especially if the structure comprises non-rectilinear portions.

The principal object of the present invention is to obviate these difficulties by providing a cheap, efficient and simple device whereby an indefinite number of tubular unit members may be coupled together in sleeved relation and securely maintained in the assembled position, with the minimum of skill and effort irrespective of whether the assembly includes non-rectilinear portions.

A further object of the present invention is to provide a coupling device comprising a tubular member having an opening intermediate the ends thereof and a winch device mounted over said opening and including a housing within which a spool or drum is rotatably mounted to be driven by means provided outside said housing, for winding up or unwinding a cable which is threaded through said opening and through the unit members which it is desired to assemble, said cable having one end fixed to said spool and the other end secured to fixing means provided in one, generally the last, of the unit members, so that by tautening the cable by means of the winch the unit members may be brought into sleeved engagement and held therein so long as the cable is under tension. To this latter end means are conveniently provided for locking the spool in tautening position.

The invention will now be further described with reference to the particular embodiment illustrated in the accompanying drawing in which:

Fig. 1 is a plan view of the coupling device with certain parts removed, shown in relation with a plurality of tubular sections adapted to be assembled together, and Fig. 2 is a perspective view of the coupling device with certain portions cut away, shown in aligned relation with a tubular section preparatory to the assembly operation.

As seen from the drawing, our novel coupling device comprises essentially a tubular member 15 having an opening 14 intermediate the ends thereof, over which a housing 3 is located said housing being secured to the tubular member by any suitable means. For example, the housing may comprise a side-wall portion 1 of U section and end walls 17, one end of which is concavely arcuate as shown at 18 to define together with the curved portion of the U section side-wall portions circular apertures through which the tubular member 15 may be passed, whereupon the housing may be secured in position as by spot welding, or by means of screws 19.

Within said housing is rotatably mounted a spool or drum 4. Preferably, said spool is fast on a spindle 5, which projects through the side walls of the housing and is adapted to receive on one end an operating means such as a handle 9, and on the other end a securing nut 7 locked by means of cotter 8. In this way, the drum may be caused to rotate by actuating means located on the outside of the housing, so that the spool may be protected by means of a cover-plate (not shown) which may be secured to the end 2 of the housing remote from the tubular member.

One end of a cable 13 is made fast as shown at 12 to the spool and the other end is passed through the opening 14 into the interior of the tubular member 15 and thence out through one end of said tubular member, so that said cable may be threaded through each of the plurality of tubular sections such as the sections 20 which are to be asembled to the tubular member 15 in sleeved relationship. One of said tubular sections 20 and preferably the one farthest removed from the tubular member 15 is provided with fixing means (not shown) whereby the end of the cable remote from the spool 4 may be secured.

As best seen in Fig. 2, the spool 4 is provided with holes or recesses 10 adapted to receive a locking member in the form of a pin 11 to lock said spool in position when the cable has been sufficiently tautened as will be hereinafter explained. Conveniently, one or both of the side walls of the housing are perforated to allow of the passage of the pin 11 and said pin may, for security, be attached to the housing as by means of a chain 22.

The tubular sections 20 are adapted to be connected together by sleeve joints and are, therefore, provided at one end with sleeves 16. The tubular member 15 may likewise be provided with such a sleeve if desired.

When the free end of the cable has been secured to the fixing means as above described, the tubular member and the tubular sections are arranged in the desired alignment and the unsleeved end of one member or section is thrust into the sleeve of the succeeding member. Thereupon, the spool 4 is caused to rotate by operation of handle 8 so as to wind up the cable 13. It is to be noted that the pin 11 will already have been withdrawn so as to permit of the unwinding of the required length of cable. The tautening of the cable will force the units of the assembly home into the respective sleeves until the unsleeved ends abut against the shoulders usually present at the inner end of the inside of the sleeve portions, whereupon the pin 11 is inserted into one of the holes 10 to hold the spool 4 in cable-tautening position and thereby to maintain the elements of the assembly in fully engaged relationship.

Such an assembly may readily be dismantled by merely withdrawing the pin 11 from the spool and rotating the latter to slacken the cable sufficiently to allow the tubular units to be separated, whereupon the cable may be wound up on the spool and the pin reinserted so that when the coupling member is not in use the cable is wholly contained within the housing 3.

We claim:

A coupling device for securing together in sleeved relation a plurality of tubular units, comprising a tubular member having an opening intermediate its ends, a housing mounted on said tubular member over said opening, a spool rotatably mounted within said housing, means outside of said housing operatively associated with said spool for rotating same, locking means for securing said spool against rotation, and a cable having one end secured to said spool, said cable being adapted to be passed through said opening into said tubular member and thence through one end thereof into and through a plurality of sleeved tubular sections adapted to be assembled together with said tubular member, in sleeved relationship and fixing means provided in one of said tubular sections for securing the other end of said cable, whereby said cable may be tautened by rotating said spool, to bring said tubular member and said tubular sections into and maintain them in sleeved engagement.

DELFOR AUGUSTO GIMÉNEZ.
MAURICIO URBANDT.